United States Patent
Lu

(10) Patent No.: US 9,732,701 B2
(45) Date of Patent: Aug. 15, 2017

(54) CENTER BODY ATTACHMENT SYSTEM

(71) Applicant: ROHR, INC., Chula Vista, CA (US)

(72) Inventor: Jinqiu Jacques Lu, Murrieta, GA (US)

(73) Assignee: ROHR, INC., Chula Vista, CA (US)

( * ) Notice: Subject to any disclaimer, the term of this patent is extended or adjusted under 35 U.S.C. 154(b) by 642 days.

(21) Appl. No.: 14/275,755

(22) Filed: May 12, 2014

(65) Prior Publication Data
US 2015/0322890 A1  Nov. 12, 2015

(51) Int. Cl.
| F02K 1/80 | (2006.01) |
| F01D 25/24 | (2006.01) |
| B23P 15/00 | (2006.01) |
| F01D 25/30 | (2006.01) |

(52) U.S. Cl.
CPC .............. F02K 1/80 (2013.01); B23P 15/008 (2013.01); F01D 25/30 (2013.01); F02K 1/805 (2013.01); F01D 25/243 (2013.01); F05D 2230/642 (2013.01); Y02T 50/672 (2013.01); Y10T 29/4995 (2015.01); Y10T 29/49325 (2015.01); Y10T 403/1624 (2015.01); Y10T 403/7015 (2015.01)

(58) Field of Classification Search
CPC ...... B23P 15/008; F01D 25/243; F01D 25/30; F02K 1/80; F02K 1/805; F05D 2230/642; Y02T 50/672; Y10T 29/49325; Y10T 29/49826; Y10T 29/49947; Y10T 29/49948; Y10T 29/4995; Y10T 403/1616; Y10T 403/1624; Y10T 403/645; Y10T 403/7015; Y10T 403/7041

USPC .............. 403/13, 14, 337, 353, 362; 29/428, 29/525.01, 525.02, 525.03, 889.23

See application file for complete search history.

(56) References Cited

U.S. PATENT DOCUMENTS

| 5,592,814 A * | 1/1997 | Palusis ...................... F02K 1/80 60/753 |
| 7,153,054 B2 * | 12/2006 | Arbona ................ B62D 29/048 403/28 |
| 7,722,317 B2 * | 5/2010 | Schiavo ................ F01D 25/246 266/285 |

(Continued)

FOREIGN PATENT DOCUMENTS

| DE | 102008044445 | 2/2009 |
| EP | 1598562 | 11/2005 |

(Continued)

OTHER PUBLICATIONS

Extended European Search Report dated Oct. 21, 2015 in European Application No. 15167138.5.

(Continued)

*Primary Examiner* — Josh Skroupa
(74) *Attorney, Agent, or Firm* — Snell & Wilmer, L.L.P.

(57) ABSTRACT

A center body attachment system may comprise an engine flange, a center body mounting assembly, and a center body. The center body mounting assembly may retain the center body and the engine flange in slidable engagement, whereby the engine flange and the center body may expand and contract at different rates. The center body may comprise a housing. The housing may comprise a floating counter bore, a spring supporting the floating counter bore, and a slider radially inward of the floating counter bore and retained within the housing by a nut.

13 Claims, 5 Drawing Sheets

(56) References Cited

U.S. PATENT DOCUMENTS

| | | |
|---|---|---|
| 2005/0260034 A1 | 11/2005 | Arbona |
| 2008/0178465 A1 | 7/2008 | Schiavo et al. |
| 2010/0263194 A1 | 10/2010 | Morrison |
| 2011/0203255 A1* | 8/2011 | Conete ............... F02K 1/80 60/226.1 |
| 2012/0023968 A1 | 2/2012 | Shteyman et al. |
| 2014/0165574 A1 | 6/2014 | Bienvenu |
| 2014/0241863 A1* | 8/2014 | Tardif ................ F02K 1/80 415/145 |
| 2015/0152788 A1 | 6/2015 | De Sousa |
| 2015/0226083 A1* | 8/2015 | Renggli ............... F02C 7/20 29/889.2 |
| 2016/0131083 A1 | 5/2016 | Lu et al. |

FOREIGN PATENT DOCUMENTS

| | | |
|---|---|---|
| EP | 2944776 | 11/2015 |
| FR | 2988777 | 10/2013 |
| NO | 2014058502 | 4/2014 |
| WO | 2013121155 | 8/2013 |

OTHER PUBLICATIONS

Office Action dated Dec. 14, 2016 in U.S. Appl. No. 14/536,273.
Extended European Search Report dated Apr. 4, 2016 in European Application No. 15193459.3.

* cited by examiner

CENTER BODY ATTACHMENT SYSTEM

FIELD

The present disclosure relates to turbine engine systems and, more specifically, to an attachment system for use with a turbine engine center body.

BACKGROUND

Turbine engine exhaust nozzles frequently have a center body designed to direct the flow of exhaust gas. Frequently, the center body is made of the same material as the surrounding engine structure. However, this material is often heavy and has limited ability to withstand very high temperatures. Thus, there is often a need to make the center body from a different material than the surrounding engine structure. However, the difference in thermal expansion between the dissimilar materials exerts a significant load on the mounting apparatus. This load limits the available choices of materials and geometry of engine center bodies.

SUMMARY

In accordance with various embodiments, a center body attachment system is disclosed. A center body attachment system may include an engine flange, a center body mounting assembly, and a center body, wherein the center body mounting assembly retains the center body and the engine flange in slidable engagement, whereby the engine flange and the center body may at least one of expand and contract at a different rate.

In accordance with various embodiments, a method of assembling a center body attachment system is disclosed. A method may include axially sliding a center body joined with a center body mounting assembly having a housing over an engine flange, wherein the engine flange has an engine flange ring having a nutplate. A method may further include positioning the engine flange ring radially inward of the center body, aligning the housing with the nutplate, and inserting a fastener through the housing and into the nutplate.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

Figure 1:
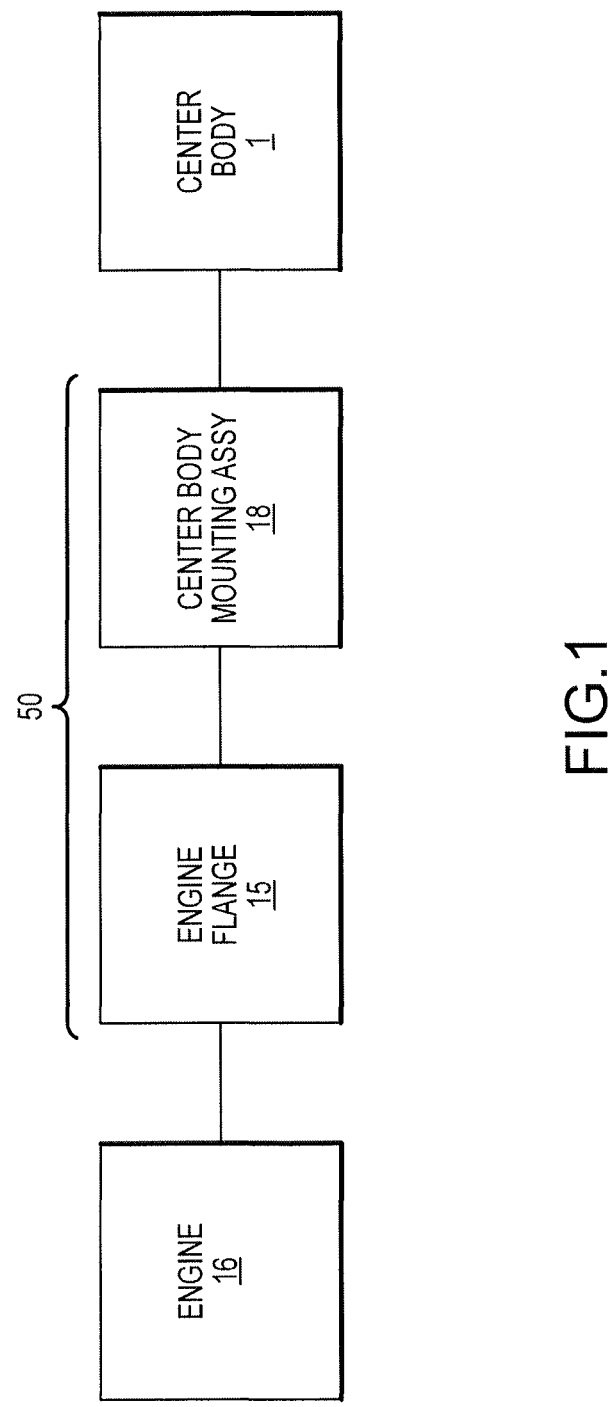
FIG. 1 illustrates a block diagram of various aspects of a center body attachment system, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

As used herein, "behind" or "aft of" or "radially inward" means disposed at a position along an indicated axis illustrated in the figures having a smaller positive value, or a greater negative value with respect to the origin of the axes system than the component that said item is located "behind." For example, if a first item is located behind a second item along the X-axis, the first item is disposed at a position along the X-axis illustrated in the figures having a smaller positive value, or a greater negative value with respect to the origin of the axes system than the second item.

As used herein, "in front of" or "forward of" or "radially outward" means disposed at a position along an indicated axis illustrated in the figures having a greater positive value, or a lesser negative value with respect to the origin of the axes system than the component that said item is located "in front of." For example, if a first item is located in front of a second item along the Z-axis, the first item is disposed at a position along the Z-axis illustrated in the figures having a greater positive value, or a smaller negative value with respect to the origin of the axes system than the second item.

In various embodiments, a center body attachment system may comprise an engine flange, a center body, and a center body mounting assembly. The center body mounting assembly retains the center body and the engine flange in slidable engagement, whereby the engine flange and the center body may expand and contract at different rates. In various embodiments, the center body attachment system attaches the center body to an engine. For example, with reference to FIG. 1, a center body attachment system 50 may comprise an engine flange 15, and a center body mounting assembly 18, whereby a center body 1 and an engine 16 are attached together. Center body 1 and engine flange 15 may be fixed in slidable engagement by the junction of engine flange 15 and center body mounting assembly 18. In this manner, mechanical continuity may be maintained between the engine flange 15 and the center body 1 having different rates of thermal expansion. Moreover, the center body 1 may be retained in proximity to engine 16, permitting center body 1 to direct exhaust flow from the engine 16.

In various embodiments, center body mounting assembly 18 comprises a housing, a washer, and a nut, wherein the housing further comprises a floating counter bore, a spring, and a slider. For example, with reference to FIGS. 1, 3, and 5, center body mounting assembly 18 may comprise a housing 2, a washer 3, and a nut 4. In various embodiments, the housing 2 extends through an aperture in a center body 1 and is retained in position by a washer 3 and a nut 4, wherein the washer 3 is disposed against an inside face of center body 1, and the nut 4 is disposed against the inside face of the washer 3, whereby the nut 4 compresses the washer 3 against the center body 1, thus compressing a portion of the center body 1 between the housing 2 and the washer 3.

Figure 3:
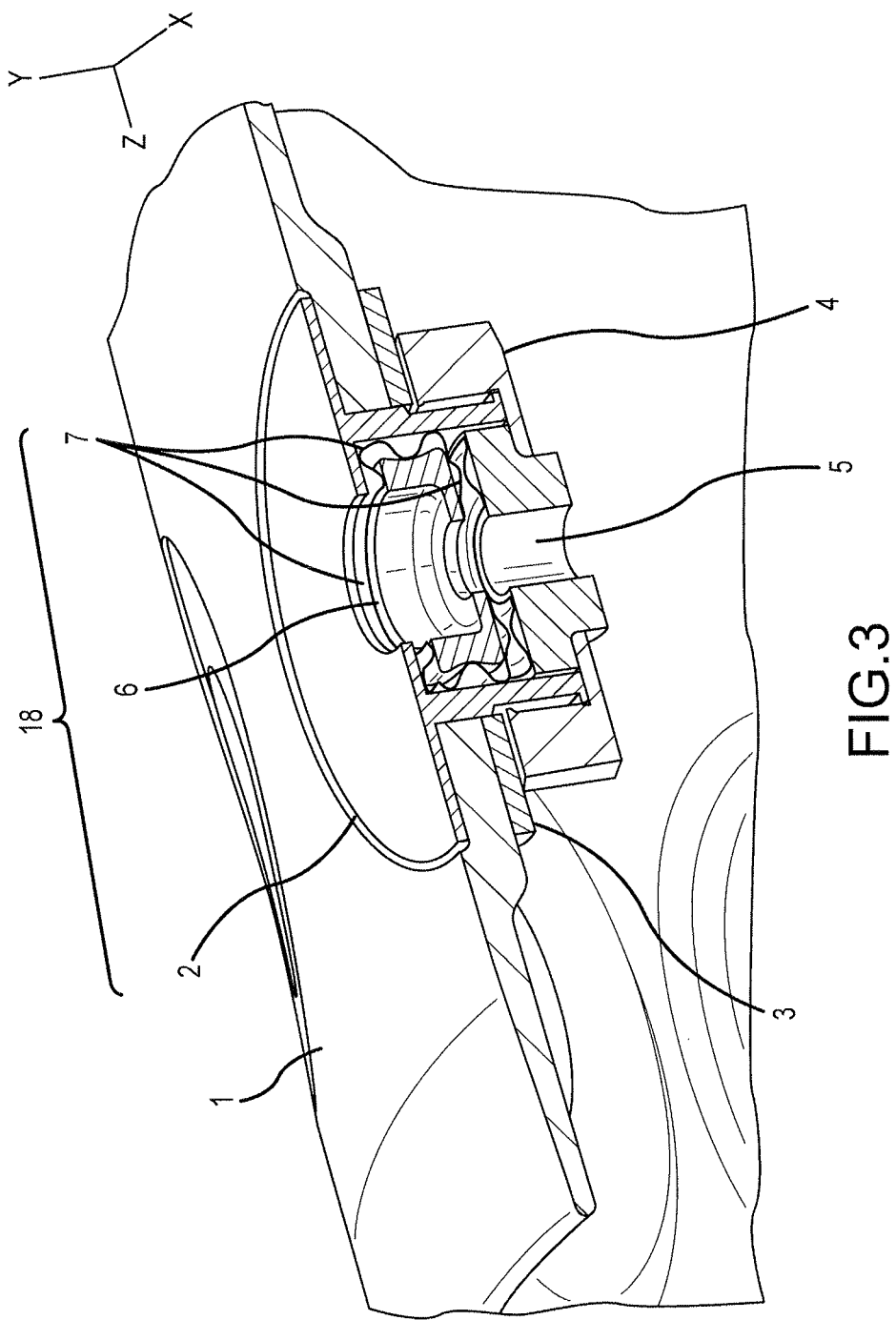
FIG. 3 illustrates a cut away view of various aspects of a center body attachment system, in accordance with various embodiments.
Figure 5:
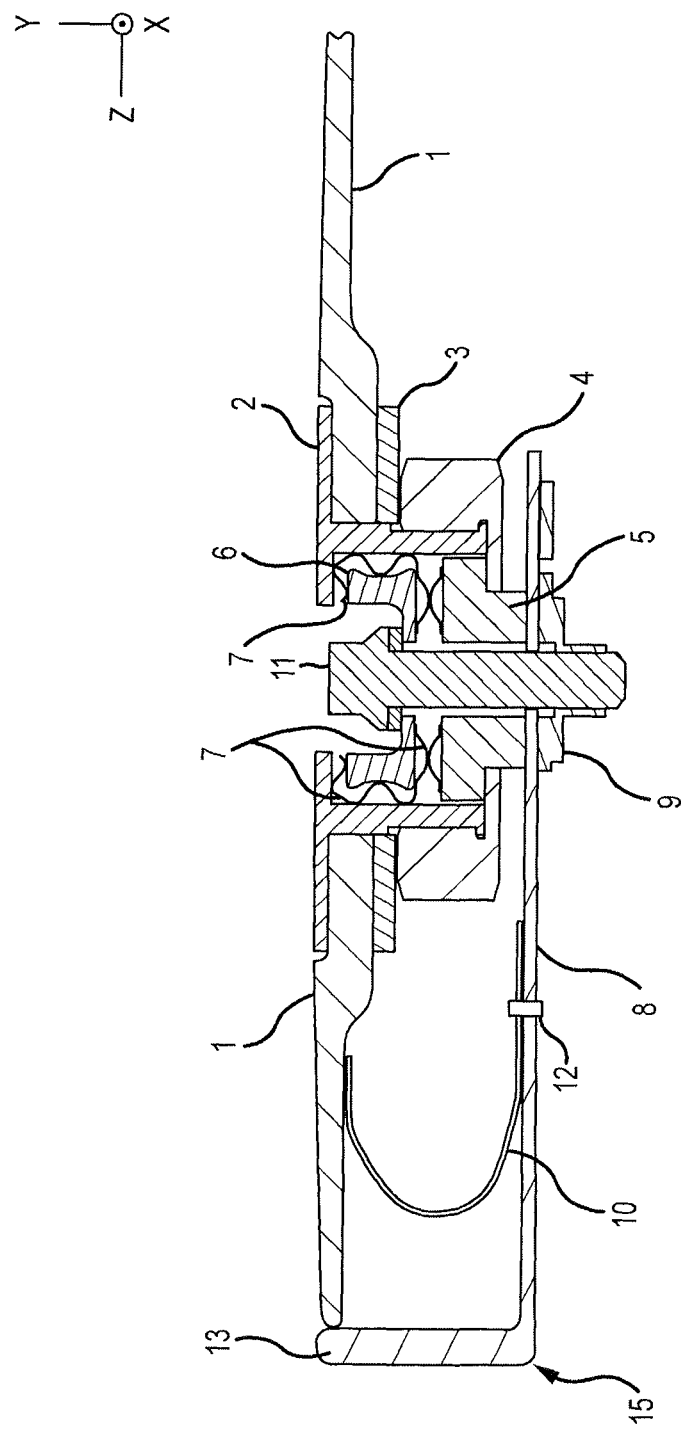
FIG. 5 illustrates a section view of various aspects of an engine flange and a center body attached together, in accordance with various embodiments.

In various embodiments, the housing 2 further comprises a floating counter bore 6, a spring 7, and a slider 5. In various embodiments, the floating counter bore 6 comprises an outer radius less than the inner radius of the housing 2. In various embodiments, spring 7 is disposed within the gap created by this difference in radius (in the X-Z plane as illustrated in FIGS. 3 and 5) between the housing 2 and the floating counter bore 6. In this manner, the floating counter bore 6 is spaced from the housing 2. Similarly, in various embodiments, the floating counter bore 6 comprises a bore height (along the Y-axis as illustrated in FIGS. 3 and 5) less than the bore height of the housing 2. In various embodiments, spring 7 is disposed within the gap between the housing 2 and the floating counter bore 6. Thus, one having ordinary experience in the art will recognize that in various embodiments, the floating counter bore 6 is positioned inside housing 2, but does not contact the housing 2, but is instead supported by spring 7. In this manner, the floating counter bore 6 may be said to float on the spring 7 within the housing 2.

In various embodiments, a slider 5 is disposed within the housing 2 radially inward (along the Y-axis) of the floating counter bore 6 and spring 7. A slider may comprise an annulus having a central aperture. The slider 5 is retained within the housing 2 by the nut 4. Thus, slider 5 may slide radially inward and outward (along the Y-axis), as bounded by nut 4 and the spring 7. In various embodiments, a slider may further comprise a boss extending radially inward (along the Y-axis) through an aperture in the nut 4, for example, as discussed herein, so that an engine flange 15 may abut the slider 5 (FIG. 5). As will be discussed further herein, a fastener 11 (FIG. 5) may be inserted through the floating counter bore 6 and the slider 5, for example, into a nutplate of an engine flange disposed radially inward (along the Y axis) of the center body 1. As such, the center body 1 may be mounted to the engine flange 15, but permitted to move radially inward and outward (along the Y-axis) by slider 5, thus expanding and contracting in response to changes in temperature.

Figure 4:
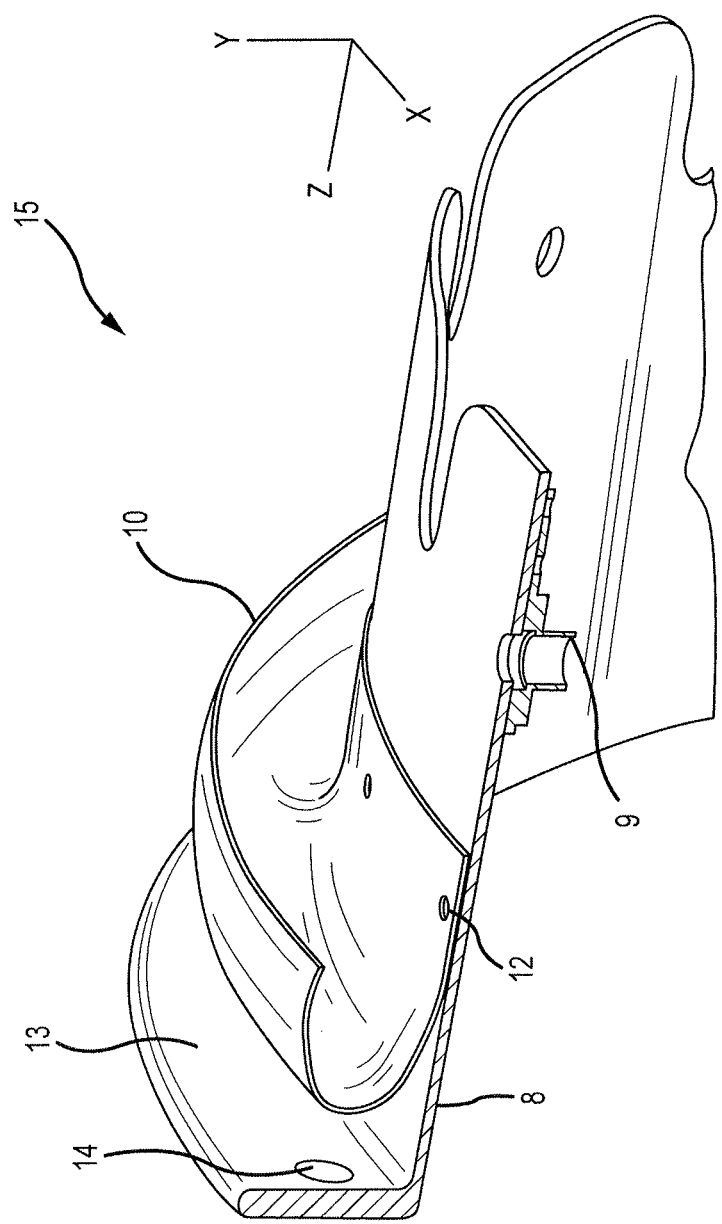
FIG. 4 illustrates a cut away view of various aspects of an engine flange, in accordance with various embodiments.

With reference now to FIGS. 1, 4, and 5, in various embodiments, an engine flange may comprise an engine attachment face, a flange ring, a seal and a nutplate. For example, engine flange 15 may comprise an engine attachment face 13, an engine flange ring 8, a seal 10, and a nutplate 9. In various embodiments, the engine attachment face 13 comprises a planar ring extending radially outward (along the Y-axis) in a Y-X plane, outward from an engine flange ring 8. In various embodiments, the engine attachment face 13 comprises a plurality of engine attachment apertures 14 by which the engine flange 15 may be joined to an engine 16. Moreover, the engine flange ring 8 may comprise an axially extending cylinder (about the Z-axis), comprising an outer diameter chosen to fit radially inward (along the Y-axis) of a center body mounting assembly 18 according to FIG. 3. With continued reference to FIG. 4, a seal 10 may be disposed about a radially outward surface (along the Y-axis) of engine flange ring 8 and joined to engine flange ring 8 by rivets 12. In various embodiments, seal 10 prevents exhaust gases from escaping between the juncture of an engine flange 15 and a center body mounting assembly 18 of a center body 1 in accordance with principles discussed later herein. Finally, a nutplate 9 may be positioned axially inboard of the seal 10 (along the Z-axis). As discussed further herein, nutplate 9 may comprises a threaded aperture configured to receive a fastener 11 inserted through the floating counter bore 6 and the slider 5 of center body mounting assembly 18. In this manner, the center body mounting assembly 18 and the engine flange 15 may be mechanically interconnected.

Figure 2:
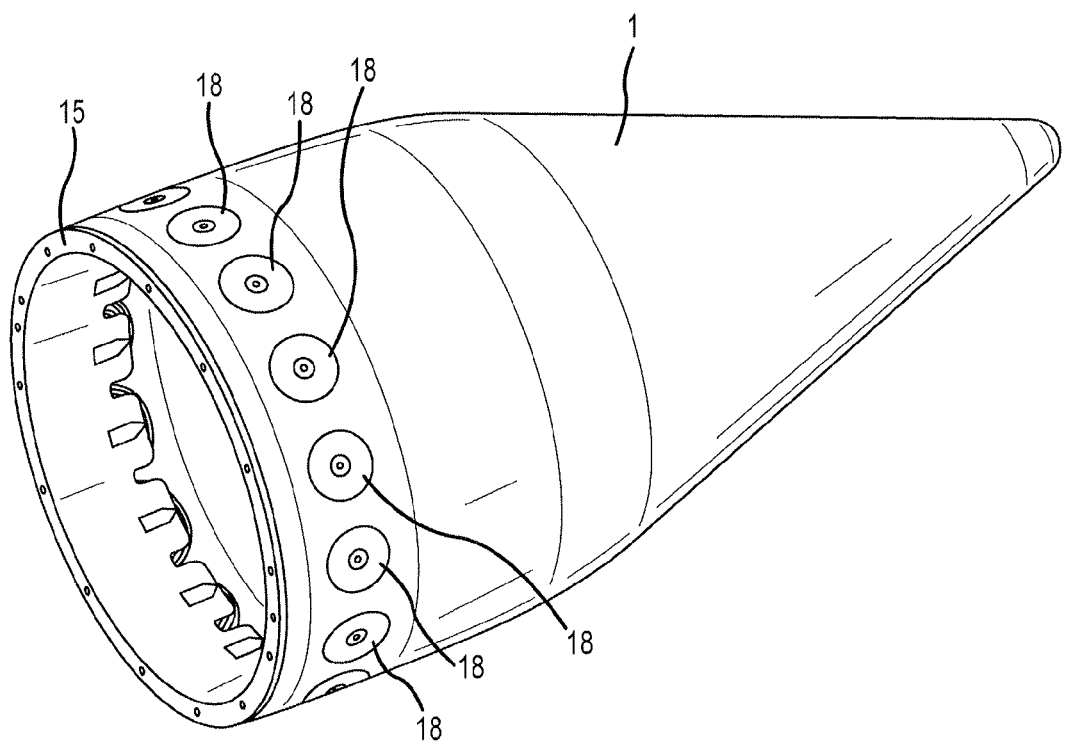
FIG. 2 view of various aspects of an engine flange and a center body attached together, in accordance with various embodiments.

Having discussed various aspects of an engine flange 15, as well as various aspects of a center body 1, and a center body mounting assembly 18, in various embodiments, multiple nutplates 9 and multiple center body mounting assemblies 18 may be joined in mechanical communication, thus joining the engine flange 15 in mechanical communication with the center body 1. For example, with reference to FIGS. 2 and 4, in various embodiments, a plurality of nutplates 9 may be disposed about the circumference of an engine flange 15 and a plurality of center body mounting assemblies 18 may be disposed about the circumference of a center body 1. In various embodiments, the center body 1 is 20 inches (+/−2 inches) in diameter and sixteen center body mounting assemblies 18 are disposed about the circumference of the center body 1. In various embodiments, a matching arrangement of nutplates 9 is disposed about an engine flange 15.

Having discussed various aspects of an engine flange 15, as well as various aspects of a center body 1, and a center body mounting assembly 18, an engine flange 15 and center body 1 may be joined according to various methods. With reference to FIGS. 1 and 5, in various embodiments, a center body 1 may be joined with a center body mounting assembly 18. The center body 1 with center body mounting assembly 18 may then be slid axially over an engine flange ring 8 of an engine flange 15, until housing 2 aligns with the nutplate 9. At this point, a fastener 11, for example, a bolt, may be inserted through the floating counter bore 6 and slider 5 and into nutplate 9, and tightened. In this manner, engine flange ring 8 is drawn into fixed mechanical contact with slider 5. Because slider 5 may move within housing 2, the center body 1 may be held in mechanical communication with the engine flange 15, but both the center body 1 and the engine flange 15 may be permitted to expand or contract radially inward or outward (along the Y-axis), whereby the slider 5 and floating counter bore 6 may translate within the housing 2. Moreover, the seal 10 may extend from engine flange ring 8 to center body 1. In various embodiments, seal 10 comprises a curved piece of mechanically elastic material, for example, an elastic metal. In various embodiments, the seal 10 comprises an austenitic nickel-chromium-based alloy such as Inconel®, which is available from Special Metals Corporation of New Hartford, N.Y., USA, whereby gas and/or heat may be prevented from escaping as the center body 1 and the engine flange 15 expand or contract.

Now, having described various components of various exemplary center body attachment systems, a center body attachment system may be manufactured from various materials. In one exemplary embodiment, a center body attachment system may comprise metal. For example, a center body attachment system may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having a desired strength, stiffness, or flexibility sufficient to maintain resiliency during use. In various embodiments, various portions of center body attachment systems as disclosed herein are made of different materials or combinations of materials, and/or may comprise coatings.

In various embodiments, center body attachment systems may comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, or heat tolerance.

In various embodiments, various components may comprise an austenitic nickel-chromium-based alloy such as Inconel®, which is available from Special Metals Corporation of New Hartford, N.Y., USA. For example, various aspects of an engine flange 15 may comprise an austenitic nickel-chromium-based alloy such as Inconel®. For example, a seal 10, and/or an engine flange 15, and/or a nutplate 9 may comprise an austenitic nickel-chromium-based alloy such as Inconel®. Similarly, various aspects of a center body 1 and/or a center body mounting assembly 18 may comprise an austenitic nickel-chromium-based alloy such as Inconel®. For example, a slider 5 and/or a floating counter bore 6, and/or a spring 7 may comprise an austenitic nickel-chromium-based alloy such as Inconel®.

In various embodiments, various components may comprise ceramic matrix composite (CMC). For example, various aspects of a center body 1 and/or a center body mounting assembly 18 may comprise ceramic matrix composite (CMC). For example, a center body 1 may comprise ceramic matrix composite (CMC). Thus, as discussed herein, the center body 1 may exhibit a different coefficient of thermal expansion than the engine flange 15. However, the different materials may be securely mounted in slidable mechanical communication according to the principles discussed herein. Moreover, a center body 1 may comprise any material suitably lightweight and heat tolerant.

In various embodiments, various aspects of a center body 1 and/or a center body mounting assembly 18 may comprise refractory metal, for example, an alloy of titanium, for example titanium-zirconium-molybdenum (TZM). For example, in various embodiments, housing 2, and/or washer 3, and/or nut 4 may comprise TZM.

In various embodiments, while the center body attachment systems described herein have been described in the context of aircraft applications; however, one will appreciate in light of the present disclosure, that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having different materials exposed to fluctuating temperatures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A center body attachment system comprising:
    an engine flange;
    a center body mounting assembly comprising a washer, a nut, and a housing, the housing comprising:
        a floating counter bore disposed within the housing,
        a spring disposed within the housing and supporting the floating counter bore, and
        a slider disposed within the housing and radially inward of the floating counter bore and retained within the housing by the nut; and
    a center body,
    wherein the washer and the nut attach the housing to the center body and the center body mounting assembly retains the center body and the engine flange in slidable engagement, whereby the engine flange and the center body may at least one of expand and contract at a different rate.

2. The center body mounting assembly according to claim 1, wherein the housing extends through an aperture in the center body and is retained in position by the washer and the nut, wherein the washer is disposed against an inside face of the center body and the nut is disposed against an inside face of the washer whereby the nut compresses the washer against the center body, whereby a portion of the center body is compressed between the housing and the washer.

3. The center body mounting assembly according to claim 1,
wherein the floating counter bore comprises an outer radius less than an inner radius of the housing,
wherein the floating counter bore comprises a bore height less than a bore height of the housing, and
wherein the spring is further disposed within a gap between the bore height of the floating counter bore and the bore height of the housing.

4. The center body attachment system according to claim 1, further comprising:
an engine attachment face by which the engine flange may be joined to an engine;
an engine flange ring comprising an axially extending cylinder;
a seal configured to seal a space between the engine flange ring and the center body; and
a nutplate configured to receive a fastener whereby the center body mounting assembly may be held in slidable engagement with the engine flange,
wherein the engine flange ring supports the seal and the nutplate.

5. The center body attachment system according to claim 4, wherein the engine attachment face comprises a planar ring extending radially outward from the engine flange ring and comprising a plurality of engine attachment apertures by which the engine flange may be joined to the engine.

6. The center body attachment system according to claim 4,
wherein the axially extending cylinder comprises an outer diameter chosen to fit radially inward of the center body mounting assembly.

7. The center body attachment system according to claim 4, wherein the seal is disposed about a radially outward surface of the engine flange ring and joined to the engine flange ring by a plurality of rivets.

8. The center body attachment system according to claim 4, wherein the nutplate is positioned axially inboard of the seal.

9. The center body attachment system of claim 1, comprising:
sixteen center body mounting assemblies evenly spaced about a circumference of the center body, wherein the center body is 18 to 22 inches in diameter.

10. The center body attachment system of claim 1,
wherein the center body comprises a ceramic matrix composite, and
wherein the engine flange comprises an austenitic nickel-chromium-based alloy.

11. A method of assembling a center body attachment system comprising:
axially sliding a center body joined with a center body mounting assembly comprising a housing over an engine flange, wherein the engine flange comprises an engine flange ring comprising a nutplate, and wherein the housing comprises:
a floating counter bore disposed within the housing,
a spring positioned inside the housing and supporting the counter bore, and
a slider disposed inside the housing and radially inward of the floating counter bore; and
positioning the engine flange ring radially inward of the center body;
aligning the housing with the nutplate; and
inserting a fastener through the housing and into the nutplate.

12. The method of claim 11,
wherein the fastener passes through the floating counter bore and the slider, whereby the center body and the engine flange may be retained in slidable engagement, whereby the center body and the engine flange may expand and contract radially inward and outward.

13. The method of claim 11 further comprising:
tightening the fastener, wherein the fastener is a bolt.

* * * * *

UNITED STATES PATENT AND TRADEMARK OFFICE
CERTIFICATE OF CORRECTION

PATENT NO. : 9,732,701 B2  
APPLICATION NO. : 14/275755  
DATED : August 15, 2017  
INVENTOR(S) : Jinqiu Jacques Lu Page 1 of 1

It is certified that error appears in the above-identified patent and that said Letters Patent is hereby corrected as shown below:

In the Claims

Column 8 Line 24 please delete "the counter bore," and insert therefor --the floating counter bore,--

Signed and Sealed this
Twelfth Day of June, 2018

Andrei Iancu
*Director of the United States Patent and Trademark Office*